(12) United States Patent
Fouda et al.

(10) Patent No.: US 10,031,254 B2
(45) Date of Patent: Jul. 24, 2018

(54) ELECTRODE-BASED TOOL MEASUREMENT CORRECTIONS BASED ON LEAKAGE CURRENTS ESTIMATED USING A PREDETERMINED INTERNAL IMPEDANCE MODEL OR TABLE

(71) Applicant: HALLIBURTON ENERGY SERVICES, INC., Houston, TX (US)

(72) Inventors: Ahmed E. Fouda, Houston, TX (US); Burkay Donderici, Houston, TX (US); Luis Emilio San Martin, Houston, TX (US)

(73) Assignee: Halliburton Energy Services Inc., Houston, TX (US)

( * ) Notice: Subject to any disclaimer, the term of this patent is extended or adjusted under 35 U.S.C. 154(b) by 0 days.

(21) Appl. No.: 15/310,397

(22) PCT Filed: Oct. 9, 2015

(86) PCT No.: PCT/US2015/054980
§ 371 (c)(1),
(2) Date: Nov. 10, 2016

(87) PCT Pub. No.: WO2016/057946
PCT Pub. Date: Apr. 14, 2016

(65) Prior Publication Data
US 2017/0269253 A1 Sep. 21, 2017

Related U.S. Application Data

(60) Provisional application No. 62/062,723, filed on Oct. 10, 2014.

(51) Int. Cl.
*G01V 3/20* (2006.01)
(52) U.S. Cl.
CPC ..................................... *G01V 3/20* (2013.01)

(58) Field of Classification Search
None
See application file for complete search history.

(56) References Cited

U.S. PATENT DOCUMENTS 6,351,129 B1   2/2002   Gounot
6,359,438 B1   3/2002   Bittar
(Continued)

FOREIGN PATENT DOCUMENTS

WO   2012/067599   5/2012
WO   2012/067817   5/2012
(Continued)

OTHER PUBLICATIONS

PCT International Search Report and Written Opinion, dated Dec. 17, 2015, Appl No. PCT/US2015/054980, Filed Oct. 9, 2015, "Electrode-Based Tool Measurements Corrections Based on Leakage Currents Estimated Using a Predetermined Internal Impedance Model or Table," 11 pgs.

(Continued)

*Primary Examiner* — Jermele M Hollington
*Assistant Examiner* — Douglas X Rodriguez
(74) *Attorney, Agent, or Firm* — Benjamin Fite; Tumey L.L.P.

(57) ABSTRACT

An example system includes an electrode-based tool for deployment in a downhole environment. The electrode-based tool has a plurality of current electrodes, at least one voltage monitoring electrode, at least one return electrode, and electronics to collect one or more voltage measurements from the at least one voltage monitoring electrode as current from at least one of the plurality of current electrodes is injected into the downhole environment and flows to the at least one return electrode. The system also includes at least one processor to estimate leakage current between at least one of the plurality of current electrodes and the at least one (Continued)

return electrode based on the collected one or more voltage measurements and a predetermined internal impedance model or table. The at least one processor is configured to derive a corrected downhole environment parameter based at least in part on the estimated leakage current.

19 Claims, 8 Drawing Sheets

(56) References Cited

U.S. PATENT DOCUMENTS

| | | |
|---|---|---|
| 2003/0173968 A1 | 9/2003 | Cheung et al. |
| 2003/0184299 A1* | 10/2003 | Strack .................. G01V 11/00 324/323 |
| 2005/0179437 A1 | 8/2005 | Hayman et al. |
| 2005/0206385 A1 | 9/2005 | Strack et al. |
| 2008/0252296 A1 | 10/2008 | Hu et al. |
| 2009/0289808 A1* | 11/2009 | Prammer .............. E21B 17/003 340/853.7 |
| 2012/0326723 A1 | 12/2012 | Bloemenkamp et al. |
| 2013/0234718 A1 | 9/2013 | Li et al. |
| 2013/0257436 A1 | 10/2013 | Bittar et al. |
| 2014/0333307 A1* | 11/2014 | Ahmad .................. E21B 49/08 324/324 |

FOREIGN PATENT DOCUMENTS

| | | |
|---|---|---|
| WO | 2012/174317 | 12/2012 |
| WO | 2016/057946 | 4/2016 |
| WO | 2016/057948 | 4/2016 |

OTHER PUBLICATIONS

PCT International Search Report and Written Opinion, dated Dec. 21, 2015, Appl No. PCT/US2015/054983, Filed Oct. 9, 2015, "Electrode-Based Tool Measurement Corrections Based on Measured Leakage Currents," 13 pgs.

* cited by examiner

| [Ohm-m] | | Ideal Tool | Real Tool | | |
|---|---|---|---|---|---|
| | | No leakage current | Neglect leakage current | Exact leakage current | Approx. leakage current |
| Rf=1000 Ohm-m | Ra1 | 478.8183 | 449.8152 | 478.8183 | 478.7518 |
| | Ra2 | 978.2682 | 831.6208 | 978.2682 | 977.648 |
| | Ra3 | 974.2172 | 803.7821 | 974.2172 | 972.9682 |
| | Ra4 | 986.8191 | 790.7978 | 986.8191 | 984.5203 |
| | Ra5 | 962.8064 | 747.4853 | 962.8064 | 958.7776 |
| Rf=10,000 Ohm-m | Ra1 | 886.5833 | 792.3717 | 886.5833 | 886.545 |
| | Ra2 | 9024.392 | 3445.859 | 9024.392 | 9018.924 |
| | Ra3 | 8853.998 | 3037.475 | 8853.998 | 8842.982 |
| | Ra4 | 9321.291 | 2806.976 | 9321.291 | 9299.672 |
| | Ra5 | 9490.37 | 2495.921 | 9490.37 | 9449.152 |

| % Error | | Real Tool | | |
|---|---|---|---|---|
| | | Neglect leakage current | Exact leakage current | Approx. leakage current |
| Rf=1000 Ohm-m | Ra1 | 6.057238 | 1.31E-09 | 0.013894 |
| | Ra2 | 14.99051 | 5.43E-10 | 0.063398 |
| | Ra3 | 17.49457 | 8.33E-10 | 0.128204 |
| | Ra4 | 19.86396 | 6.63E-10 | 0.232953 |
| | Ra5 | 22.3639 | 5.15E-11 | 0.418445 |
| Rf=10,000 Ohm-m | Ra1 | 10.62637 | 3.42E-09 | 0.004321 |
| | Ra2 | 61.81616 | 2.04E-08 | 0.060596 |
| | Ra3 | 65.69375 | 6.24E-09 | 0.124418 |
| | Ra4 | 69.88641 | 3.19E-09 | 0.231922 |
| | Ra5 | 73.70049 | 7.26E-10 | 0.434316 |

FIG. 13

FIG. 14

ELECTRODE-BASED TOOL MEASUREMENT CORRECTIONS BASED ON LEAKAGE CURRENTS ESTIMATED USING A PREDETERMINED INTERNAL IMPEDANCE MODEL OR TABLE

CROSS-REFERENCE TO RELATED APPLICATION

This application claims priority to Provisional U.S. Application Ser. No. 62/062,723, titled "Methods and Systems for Analysis of Electrode-Based Tool Measurements Using Model-Based Leakage Currents" and filed Oct. 10, 2014 by Ahmed E. Fouda, Burkay Donderici and Luis Emilio San Martin, which is incorporated herein by reference.

BACKGROUND

Modern oil field operators demand access to a great quantity of information regarding the parameters and conditions encountered downhole. Such information typically includes characteristics of the earth formations traversed by the borehole and data relating to the size and configuration of the borehole itself. The collection of information relating to conditions downhole, which commonly is referred to as "logging," can be performed by several methods including wireline logging and "logging while drilling" (LWD).

In wireline logging, a sonde is lowered into the borehole after some or all of the well has been drilled. The sonde hangs at the end of a long wireline cable that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated, thereby enabling measurements of the formation while it is less affected by fluid invasion. While LWD measurements are desirable, drilling operations create an environment that is generally hostile to electronic instrumentation, telemetry, and sensor operations.

Among the available wireline and LWD tools are a variety of electrode-based tools to evaluate electromagnetic properties of a formation. For example, electrode-based tool measurements are often used in the oil and gas industry to evaluate formation resistivity. Example tools of this type are laterolog, laterolog array, and micro-spherically focused log tools. Obtaining an electrode-based tool measurement may, for example, involve placing electrodes in contact with the formation. Some electrodes inject current into the formation, while other electrodes measure voltages generated by the flow of current. The equations that relate voltages and currents for electrode-based tool measurements can be written as a linear system of equations of the form V=IR. Often assumptions are made to simplify the processing/interpretation of electrode-based measurements. An example assumption may be that there is an infinite input impedance internal to the tool between active or inactive excitation electrodes and a return electrode. Such assumptions may decrease the accuracy of electromagnetic formation properties derived from electrode-based tool measurements.

DESCRIPTION OF THE DRAWINGS

Accordingly, there are disclosed herein electrode-based tool measurement corrections based on leakage currents estimated using a predetermined internal impedance model or table. In the figures.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

Disclosed herein are methods and systems related to electrode-based tool measurement corrections based on leakage currents estimated using a predetermined internal impedance model or table. The predetermined internal impedance model or table may be generated, for example, by testing an electrode-based tool at earth surface (e.g., in a laboratory), by tracking related values (e.g., impedance, voltage, current) during deployment of one or more electrode-based tools in a downhole scenario, and/or by simulating behavior of an electrode-based tool on one or more computers. As desired, leakage currents that occur during downhole operations of an electrode-based tool may be estimated using the predetermined internal impedance model or table as well as other available measurements such as temperature, humidity, and voltages. For example, during downhole operations of an electrode-based tool, ambient temperature measurements may be collected and applied to the predetermined internal impedance model or table to obtain an internal impedance value. The obtained internal impedance value as well as one or more voltage values collected during operations of the electrode-based tool can be used to estimate leakage currents (e.g., I=V/R). Estimated leakage currents may be used, for example, to correct electrode-based tool measurements or derived values such as apparent resistivities, dielectric properties, and/or distance to anomaly values. As an example, estimated leakage currents may be applied to modified focusing mode equations that estimate apparent resistivity at one or more depths of investigation. Accounting for leakage currents as described herein improves the accuracy of derived electromagnetic properties compared to ignoring leakage currents or otherwise assuming such leakage currents are negligible.

In at least some embodiments, an example system includes an electrode-based tool for deployment in a downhole environment. The electrode-based tool may have a plurality of current electrodes, at least one voltage monitoring electrode, at least one return electrode, and electronics to collect one or more voltage measurements from the at least one voltage monitoring electrode as current from at least one of the plurality of current electrodes is injected into the downhole environment and flows to the at least one return electrode. The system also includes at least one processor to estimate leakage current between at least one of the plurality of current electrodes and the at least one return electrode based on the collected one or more voltage measurements and a predetermined internal impedance model or table. The at least one processor is configured to derive a corrected downhole environment parameter based at least in part on the estimated leakage current. The at least one processor may be part of the electrode-based tool or may be separate from the electrode-based tool (e.g., at earth's surface).

Meanwhile, an example method includes obtaining an internal impedance table or model for electrodes of an electrode-based tool. The method also includes deploying the electrode-based tool in a downhole environment, where the electrode-based tool has a plurality of current electrodes, at least one voltage monitoring electrode, and at least one return electrode. The method also includes collecting one or more voltage measurements using the at least one voltage monitoring electrode as a current from at least one of the plurality of current electrodes is injected into the downhole environment and flows to the at least one return electrode. The method also includes estimating leakage current between at least one of the plurality of current electrodes and the at least one return electrode based on the collected one or more voltage measurements and the internal impedance model or table. The method also includes deriving a correction for a downhole environment parameter based at least in part on the estimated leakage current. The method also includes storing or displaying the corrected downhole environment parameter.

Figures 1, 2:
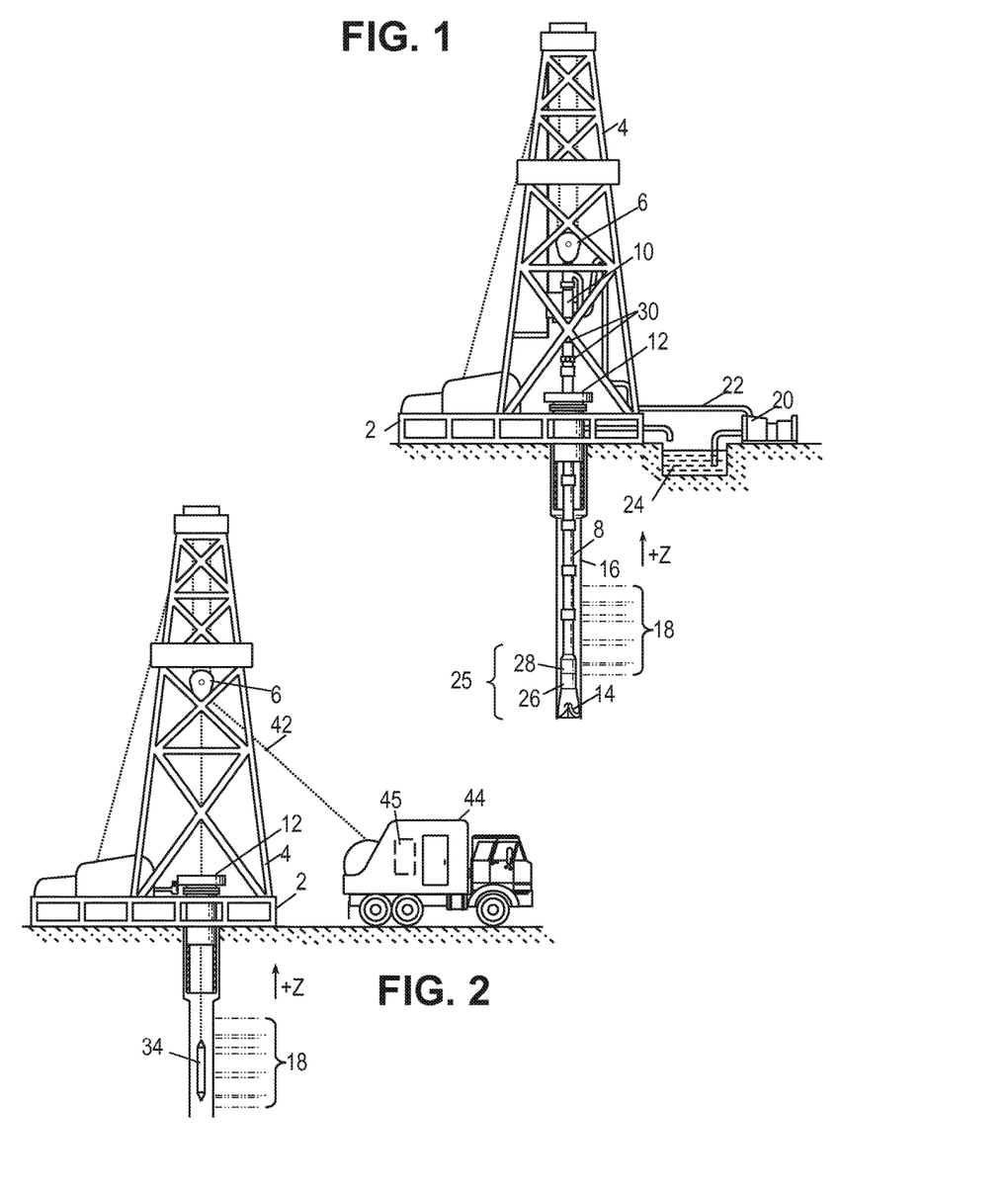
FIG. 1 is a schematic diagram showing an illustrative logging while drilling ("LWD") environment.
FIG. 2 is a schematic diagram showing an illustrative wireline logging environment.

The disclosed systems and methods are best understood in an application context. Turning now to the figures, FIG. 1 shows an illustrative logging while drilling (LWD) environment. A drilling platform 2 is equipped with a derrick 4 that supports a hoist 6 for raising and lowering a drill string 8. The hoist 6 suspends a top drive 10 suitable for rotating the drill string 8 and lowering the drill string through the well head 12. Connected to the lower end of the drill string 8 is a drill bit 14. As bit 14 rotates, it creates a borehole 16 that passes through various formations 18. A pump 20 circulates drilling fluid through a supply pipe 22 to top drive 10, down through the interior of drill string 8, through orifices in drill bit 14, back to the surface via the annulus around drill string 8, and into a retention pit 24. The drilling fluid transports cuttings from the borehole into the pit 24 and aids in maintaining the integrity of the borehole 16. Various materials can be used for drilling fluid, including a salt-water based conductive mud.

A LWD tool suite 26 is integrated into the bottom-hole assembly (BHA) 25 near the bit 14. As the bit extends the borehole through the formations, logging tool 26 collects measurements relating to various formation properties as well as the tool orientation and various other drilling conditions. The LWD tools 26 may take the form of a drill collar, i.e., a thick-walled tubular that provides weight and rigidity to aid the drilling process. (For the present discussion, the set of logging tools is expected to include an electrode-based tool such as a multi-array laterolog resistivity tool to measure formation resistivity.) A telemetry sub 28 may be included to transfer images and measurement data to a surface receiver 30 and to receive commands from the surface. In some embodiments, the telemetry sub 28 does not communicate with the surface, but rather stores logging data for later retrieval at the surface when the logging assembly is recovered.

At various times during the drilling process, the drill string 8 may be removed from the borehole as shown in FIG. 2. Once the drill string has been removed, logging operations can be conducted using a wireline logging sonde 34, i.e., a probe suspended by a cable 42 having conductors for transporting power to the sonde and telemetry from the sonde 34 to the surface. The wireline logging sonde 34 may have pads and/or centralizing springs to maintain tools near the axis of the borehole as the tool is pulled uphole. The wireline logging sonde 34 can include a variety of sensors including an electrode-based tool such as a multi-array laterolog tool for measuring formation resistivity. A logging facility 44 collects measurements from the logging sonde 34, and includes a computer system 45 for processing and storing the measurements gathered by the sensors.

Figure 3:
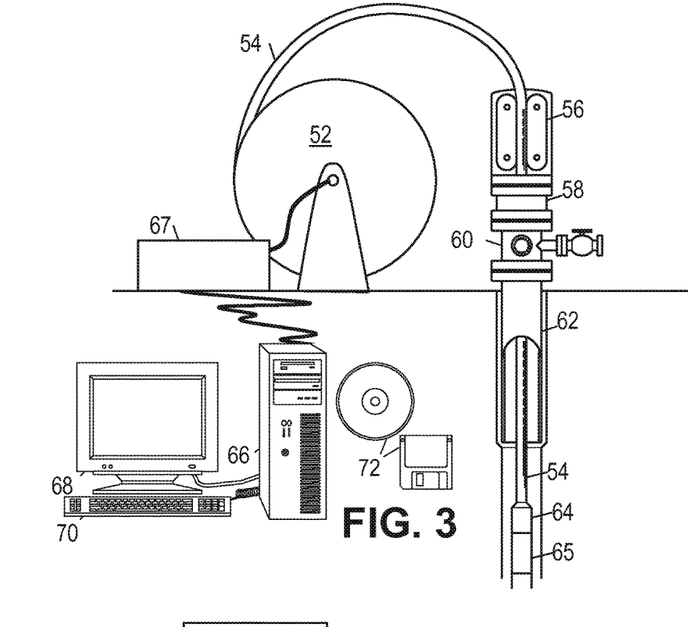
FIG. 3 is a schematic diagram showing an illustrative tubing-conveyed logging environment.

An alternative logging technique is tubing-conveyed logging. FIG. 3 shows an illustrative coil tubing logging system in which coil tubing 54 is pulled from a spool 52 by a tubing injector 56 and injected into a well through a packer 58 and a blowout preventer 60 into the well 62. In the well 62, a supervisory sub 64 and one or more logging tools 65 are coupled to the coil tubing 54 and configured to communicate to a surface computer system 66 via information conduits or other telemetry channels. The logging tools 365 can include a variety of sensors including an electrode-based tool such as a multi-array laterolog tool for measuring formation resistivity. An uphole interface 67 may be provided to exchange communications with the supervisory sub and receive data to be conveyed to the surface computer system 66.

Surface computer system 66 is configured to communicate with supervisory sub 64 to set logging parameters and collect logging information from the one or more logging tools 65 such as a multi-array laterolog tool. Surface computer system 66 includes a processing unit 67 configured to execute software (shown in FIG. 3 in the form of removable storage media 72) to monitor and/or direct the supervisory sub 64 and any logging tools 65. In at least some embodiments, the system 66 includes a display device 68 and a user-input device 70 to enable a human operator to interact with the system control software 72. Slickline or coiled tubing are other alternatives for conveying an electrode-based tool.

In each of the foregoing logging environments, the logging tool assemblies may include a navigational sensor package having directional sensors for determining the inclination angle, the horizontal angle, and the rotational angle (a.k.a. "tool face angle") of the BHA 25, wireline logging sonde 34, or logging tools 65. As is commonly defined in the art, the inclination angle is the deviation from vertically downward, the horizontal angle is the angle in a horizontal plane from true North, and the tool face angle is the orientation (rotational about the tool axis) angle from the high side of the wellbore. In accordance with known techniques, directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the BHA 25, wireline logging sonde 34, or logging tools 65 can be determined. Additionally, a three axis magnetometer measures the earth's magnetic field vector in a similar manner. From the combined magnetometer and accelerometer data, the horizontal angle of the BHA 25, wireline logging sonde 34, or logging tools 65 may be determined.

Figure 4:
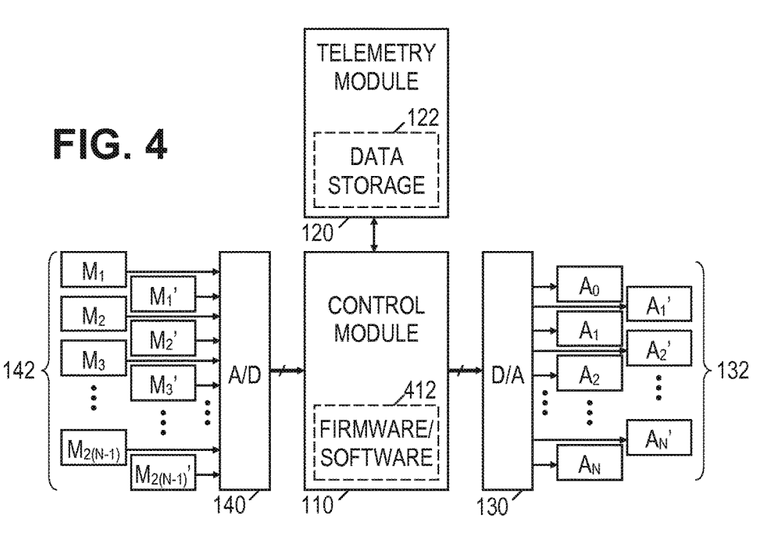
FIG. 4 is a schematic diagram showing a block diagram of an illustrative multi-array laterolog tool.

A discussion of multi-array laterolog tool electronics is in order before describing example constructions of the tool. FIG. 4 shows a functional block diagram of the tool electronics. The control module 110 governs the operation of the tool in accordance with software and/or firmware 112 stored in internal memory. The control module 110 couples to telemetry module 120 to receive commands and to provide measurement data. Control module 110 further connects to digital-to-analog converter 130 to drive current electrodes 132, and connects to analog-to-digital converter 140 to make voltage measurements via voltage monitoring electrodes 142. Control module 110 can be, for example, a general purpose processor, a digital signal processor, a programmable gate array, or an application specific integrated circuit. Telemetry module 120 receives and stores measurement data in a nonvolatile memory 122, and further operates as a communications interface between the control module 110 and the telemetry communications mechanism.

FIG. 4 shows 2N+1 current electrodes (electrodes $A_0$, $A_1$, $A_2$, ... $A_N$, $A_1'$, $A_2'$, ... $A_N'$) being independently driven via digital-to-analog converter 130. In some tool embodiments, the current electrodes are electrically connected in pairs, i.e., electrode $A_1$ is connected to electrode $A_1'$ by an electrical conductor, electrode $A_2$ is connected to electrode $A_2'$, etc. Moreover, the return electrodes are electrically connected (i.e., electrode $A_N$ is conductively coupled to electrode $A_N'$). In such alternative embodiments, the digital-to-analog converter can be simplified to drive only one electrode in each pair. Similarly, the voltage monitoring electrodes 142 can be electrically connected in pairs, i.e., with electrode $M_1$ connected to $M_1'$, electrode $M_2$ connected to $M_2'$, etc. It is also contemplated that each electrode can be individually driven/sensed and that the control module can collect the pair-wise measurements by appropriately combining the individual electrode currents and voltages.

Figure 5A:
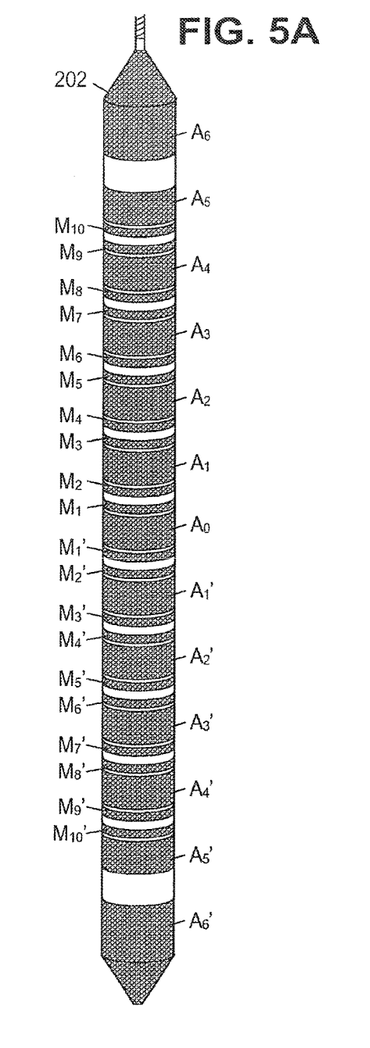
FIG. 5A is a diagram showing an illustrative multi-array laterolog tool.

FIG. 5A shows an illustrative multi-array laterolog tool 202 having (for the sake of illustration) equally-spaced current electrodes and return electrodes (electrodes $A_0$, $A_1$, $A_2$, ... $A_6$, $A_1'$, $A_2'$, ... $A_6'$), with interspersed voltage monitoring electrodes $M_1$-$M_{10}$ and $M_1'$-$M_{10}'$ on a wireline tool body. (It is desirable to separate the voltage monitoring electrodes from the current electrodes because the current electrodes often develop an impedance layer that distorts voltage measurements when current is flowing.) In practice, the electrodes are not equally sized and spaced. Better performance is achieved by having the more distant electrode increase in size. In FIG. 5A, the various electrodes are represented as being axially-spaced along the multi-array laterolog tool 202.

Figure 5B:
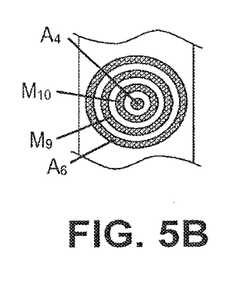
FIG. 5B-5D is a diagram showing illustrative electrode configuration options.
Figure 5C:
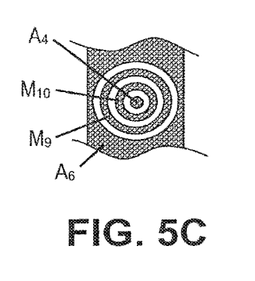
Figure 5D:
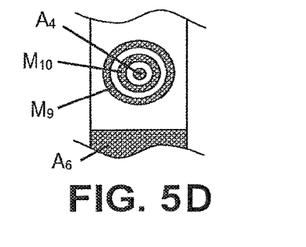

In contrast, FIGS. 5B-5D show alternative electrode configurations, where at least some of the electrodes represented are concentric relative to each other. For example, in FIG. 5B, the current electrode $A_4$ is shown to be concentric to and within voltage monitoring electrode $M_{10}$. Further, the voltage monitoring electrode $M_{10}$ is shown to be concentric to and within voltage monitoring electrode $M_9$. Further, the voltage monitoring electrode $M_9$ is shown to be concentric to and within return electrode $A_6$. The configuration of FIG. 5C is the same as FIG. 5B, except that the return electrode $A_6$ is shown to correspond to a section of the tool body surrounding the set of concentric electrodes. Meanwhile, in FIG. 5D, the return electrode $A_6$ is shown to be separated from the set of concentric electrodes by a section of the tool body. In different embodiments, combinations of axially-spaced electrodes and/or concentrically-spaced electrodes are possible.

Figure 6:
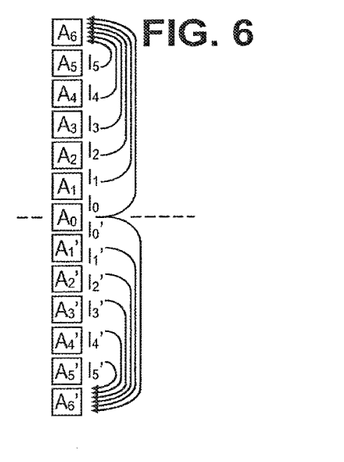
FIG. 6 is a schematic diagram showing an illustrative current flow pattern for a laterolog tool with the electrode configuration of FIG. 5A.

Regardless of the particular electrode configuration, the tool electronics employ current electrodes to provide currents (e.g., $I_0$-$I_5$ and $I_0'$-$I_5'$). FIG. 6 is a schematic diagram showing an illustrative current flow pattern for a laterolog tool with the electrode configuration of FIG. 5A. As shown, currents $I_0$-$I_5$ are sourced from electrodes $A_0$-$A_5$ respectively, with electrode $A_6$ serving as a common return electrode for each of these currents. Similarly, currents $I0'$-$I5'$ are sourced from electrodes $A_0$ and $A_1'$-$A_5'$ respectively, with electrode $A_6'$ also serving as a common return electrode for the currents. If the current and voltage monitoring electrodes are pair-wise connected as discussed before, the tool cannot distinguish currents $I_0$-$I_5$ from $I_0'$-$I_5'$, but instead operates on the combined currents ($I_0+I_0'$, $I_1+I_1'$, $I_2+I_2'$, ... ). Otherwise, the tool can analyze currents $I_0$-$I_5$ separately from $I_0'$-$I_5'$, or in the alternative, combine the currents and voltages digitally before analyzing. Due to the symmetry of the array, only the top half is illustrated in the ensuing figures. Though not shown, the bottom half is presumed to be present.

To enable the voltage monitoring electrodes to distinguish the effects of the various currents, the currents are given distinguishable features. For example, the electrodes may be pair-wise connected and currents $I_0$-$I_5$ have distinguishable signal frequencies $f_0$-$f_5$. Alternatively, the currents could be distinguished through the use of time division multiplexing, code division multiplexing, or other methods that enable the currents to be independently monitored.

While each of the currents is provided with a characteristic that makes its effects distinguishable from those of the other currents, in at least some tool embodiments some of the currents are given common features. For example, some tool embodiments provide current $I_0$ with frequencies $f_0$ and $f_1$. The sharing of frequency $f_1$ by both current $I_0$ and $I_1$ enables straightforward hardware focusing.

As the tool drives current from the current electrodes, the currents pass through the borehole fluid and the formation to reach the return electrodes, creating a field potential indicative of the resistivity of the materials along the various current flow paths. The control module 110 records a voltage signal from each of the voltage monitoring electrodes 142 to measure the field potential at the voltage monitoring electrode locations. A frequency analysis of the voltage signals (e.g., by Fourier transform, filtering, or least-squares curve fitting) separates out those voltage signal components attributable to each of the currents.

With the measurements for the current flow pattern of FIG. 6, it becomes possible to derive the measurements associated with various current flow patterns. For more information regarding measurement analysis options for a laterolog tool, reference may be had to WO 2012/067599, entitled "Multi-array Laterolog Tools and Methods", and to WO 2012/067817, entitled "Multi-array Laterolog Tools and Methods with Differential Voltage Measurements."

In the different modes of operation of an array laterolog tool (e.g., the tool represented in FIGS. 4-6), different current flows are established between current electrodes, and voltages are measured at the voltage monitoring electrodes. For example, if a mode of operation corresponds to a current flowing between current electrodes $A_0$ and $A_6$ through the formation, the current should flow only between these two electrodes and it should not enter into another current electrode and from there reach the current return. In ideal tools the impedance internal through the tool between any of the current electrodes different from $A_6$ and the point of current return should be infinite, but in real tools this condition can only be approximated. Thus, in real tools there is always some current that enters the other current electrodes and from there reaches the current return. The same is true for the voltage electrodes, but for simplification the disclosed methods and systems are directed to leakage current related to non-ideal current electrodes.

Figure 7A:
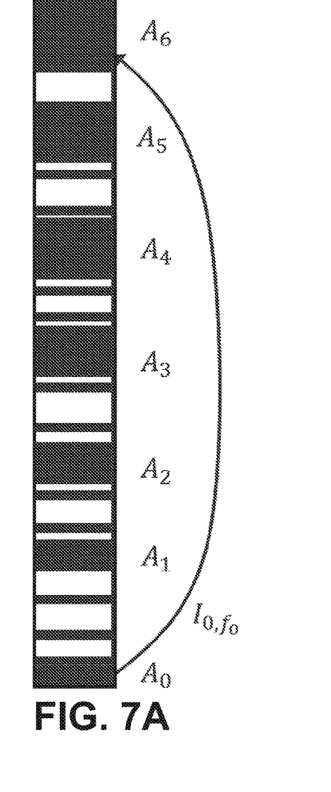
FIG. 7A is a schematic diagram showing a current flow pattern between electrodes of a laterolog tool without internal leakage currents.
Figure 7B:
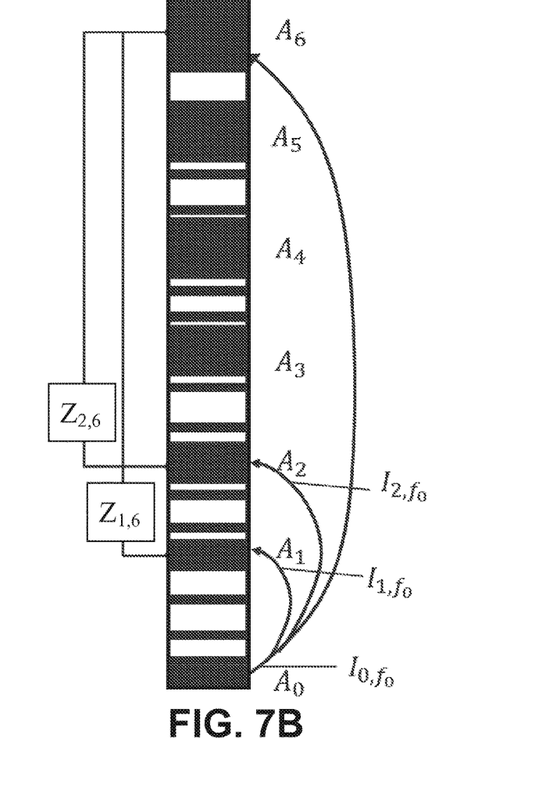
FIG. 7B is a schematic diagram showing a current flow pattern between electrodes of a laterolog tool with internal leakage currents.

The difference between ideal and real tools is illustrated schematically in FIGS. 7A and 7B. More specifically, FIG. 7A shows a current flow pattern between electrodes $A_0$ and $A_6$ without internal leakage currents. Meanwhile, FIG. 7B shows a current flow pattern between electrodes $A_0$ and $A_6$ with internal leakage currents due to a non-infinite impedance between $A_1$ and $A_6$ (labeled $Z_{1,6}$) and due to a non-infinite impedance between $A_2$ and $A_6$ (labeled $Z_{2,6}$). To account for non-infinite internal impedances between the different electrodes and the current return for the different modes of operation of the tool, the equations that describe the relationship between currents and voltages can be modified. These modifications can be used to evaluate corrections to improve tool accuracy. As an example, the original linear system of equations may be modified into another higher dimensional linear system of equations that now includes all the couplings, not only those that are present in the ideal tool.

As an example, in software focusing methods, multiple modes of operation are run simultaneously at different frequencies, with each current electrode emitting current at a single frequency. The emitted current is measured for use in the focusing equations. In addition, the currents that flow into non-active current electrodes may be taken into account. In accordance with at least some embodiments, the currents that flow into non-active current electrodes correspond to model-based leakage currents as described herein.

Without limitation to other uses of model-based leakage currents, an example is now provided for applying leakage currents, obtained in part using an internal impedance model or table as described herein, to modified equations for software focusing.

The modified software focusing equations are as follows:

Modified Focused Mode 1

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \sum_{i=0}^{2} I_{i,f_0} & \sum_{i=0}^{2} I_{i,f_0} & \sum_{i=0}^{2} I_{i,f_3} & \sum_{i=0}^{2} I_{i,f_4} & \sum_{i=0}^{2} I_{i,f_5} \\ I_{3,f_0} & I_{3,f_2} & I_{3,f_3} & I_{3,f_4} & I_{3,f_5} \\ I_{4,f_0} & I_{4,f_2} & I_{4,f_3} & I_{4,f_4} & I_{4,f_5} \\ I_{5,f_0} & I_{5,f_2} & I_{5,f_3} & I_{5,f_4} & I_{5,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\sum_{i=0}^{2} I_{i,f_1} \\ -I_{3,f_1} \\ -I_{4,f_1} \\ -I_{5,f_1} \end{bmatrix}$$

$$V_1 = C_0 V_{1,f_0} + V_{1,f_1} + C_2 V_{1,f_2} + C_3 V_{1,f_3} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a_1} = k_1 \frac{V_1}{I_0}$$

For Modified Focused Mode 1, the frequencies $f_0, f_1, \ldots, f_5$ denote different current excitation patterns. For example, $f_0$ denotes injecting current from $A_0$ and returning to $A_6$, $f_1$ denotes injecting current from $A_1$ and returning to $A_6$, and so on. Excitations can be made simultaneously at different frequencies, or sequentially using one frequency or more. These are referred to as the unfocused modes. $V_{i,f_j}$ is the voltage of the $i^{th}$ voltage monitoring electrode, with respect to the reference, when the tool is excited with frequency $f_j$. $\Delta V_{1,2,f_j}$ is the potential difference between voltage monitoring electrodes 1 and 2 when the tool is excited with frequency $f_j$. $I_{i,f_j}$ is the current injected from electrode $A_i$ when the tool is excited with frequency $f_j$. The adopted sign convention is such that $I_{i,f_j}$ is positive if it is injected from the electrode into the formation; and negative if it is returning into the electrode. Further, $k_1$ is the tool constant of Modified Focused Mode 1. Other Modified Focused Modes can be expressed as follows:

Modified Focused Mode 2

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \Delta V_{3,4,f_0} & \Delta V_{3,4,f_2} & \Delta V_{3,4,f_3} & \Delta V_{3,4,f_4} & \Delta V_{3,4,f_5} \\ \sum_{i=0}^{3} I_{i,f_0} & \sum_{i=0}^{3} I_{i,f_0} & \sum_{i=0}^{3} I_{i,f_3} & \sum_{i=0}^{3} I_{i,f_4} & \sum_{i=0}^{3} I_{i,f_5} \\ I_{4,f_0} & I_{4,f_2} & I_{4,f_3} & I_{4,f_4} & I_{4,f_5} \\ I_{5,f_0} & I_{5,f_2} & I_{5,f_3} & I_{5,f_4} & I_{5,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\Delta V_{3,4,f_1} \\ -\sum_{i=0}^{3} I_{i,f_1} \\ -I_{4,f_1} \\ -I_{5,f_1} \end{bmatrix}$$

$$V_1 = C_0 V_{1,f_0} + V_{1,f_1} + C_2 V_{1,f_2} + C_3 V_{1,f_3} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a_2} = k_2 \frac{V_1}{I_0}$$

Modified Focused Mode 3

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \Delta V_{3,4,f_0} & \Delta V_{3,4,f_2} & \Delta V_{3,4,f_3} & \Delta V_{3,4,f_4} & \Delta V_{3,4,f_5} \\ \Delta V_{5,6,f_0} & \Delta V_{5,6,f_2} & \Delta V_{5,6,f_3} & \Delta V_{5,6,f_4} & \Delta V_{5,6,f_5} \\ \sum_{i=0}^{4} I_{i,f_0} & \sum_{i=0}^{4} I_{i,f_0} & \sum_{i=0}^{4} I_{i,f_3} & \sum_{i=0}^{4} I_{i,f_4} & \sum_{i=0}^{4} I_{i,f_5} \\ I_{5,f_0} & I_{5,f_2} & I_{5,f_3} & I_{5,f_4} & I_{5,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\Delta V_{3,4,f_1} \\ -\Delta V_{5,6,f_1} \\ -\sum_{i=0}^{4} I_{i,f_1} \\ -I_{5,f_1} \end{bmatrix}$$

-continued $$V_1 = C_0 V_{1,f_0} + V_{1,f_1} + C_2 V_{1,f_2} + C_3 V_{1,f_3} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a3} = k_3 \frac{V_1}{I_0}$$

Modified Focused Mode 4

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \Delta V_{3,4,f_0} & \Delta V_{3,4,f_2} & \Delta V_{3,4,f_3} & \Delta V_{3,4,f_4} & \Delta V_{3,4,f_5} \\ \Delta V_{5,6,f_0} & \Delta V_{5,6,f_2} & \Delta V_{5,6,f_3} & \Delta V_{5,6,f_4} & \Delta V_{5,6,f_5} \\ \Delta V_{7,8,f_0} & \Delta V_{7,8,f_2} & \Delta V_{7,8,f_3} & \Delta V_{7,8,f_4} & \Delta V_{7,8,f_5} \\ \sum_{i=0}^{5} I_{i,f_0} & \sum_{i=0}^{5} I_{i,f_0} & \sum_{i=0}^{5} I_{i,f_3} & \sum_{i=0}^{5} I_{i,f_4} & \sum_{i=0}^{5} I_{i,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\Delta V_{3,4,f_1} \\ -\Delta V_{5,6,f_1} \\ -\Delta V_{7,8,f_1} \\ -\sum_{i=0}^{5} I_{i,f_1} \end{bmatrix}$$

$$V_1 = C_0 V_{1,f_0} + V_{1,f_1} + C_2 V_{1,f_2} + C_3 V_{1,f_3} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a4} = k_4 \frac{V_1}{I_0}$$

Modified Focused Mode 5

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \Delta V_{3,4,f_0} & \Delta V_{3,4,f_2} & \Delta V_{3,4,f_3} & \Delta V_{3,4,f_4} & \Delta V_{3,4,f_5} \\ \Delta V_{5,6,f_0} & \Delta V_{5,6,f_2} & \Delta V_{5,6,f_3} & \Delta V_{5,6,f_4} & \Delta V_{5,6,f_5} \\ \Delta V_{7,8,f_0} & \Delta V_{7,8,f_2} & \Delta V_{7,8,f_3} & \Delta V_{7,8,f_4} & \Delta V_{7,8,f_5} \\ \Delta V_{9,10,f_0} & \Delta V_{9,10,f_2} & \Delta V_{9,10,f_3} & \Delta V_{9,10,f_4} & \Delta V_{9,10,f_5} \end{bmatrix}$$

$$\begin{bmatrix} C_1 \\ C_3 \\ C_4 \\ C_5 \\ C_6 \end{bmatrix} = \begin{bmatrix} -\Delta V_{1,2,f_1} \\ -\Delta V_{3,4,f_1} \\ -\Delta V_{5,6,f_1} \\ -\Delta V_{7,8,f_1} \\ -\Delta V_{9,10,f_1} \end{bmatrix}$$

$$V_1 = C_0 V_{1,f_0} + V_{1,f_1} + C_2 V_{1,f_2} + C_3 V_{1,f_3} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a5} = k_5 \frac{V_1}{I_0}$$

In accordance with at least some embodiments, leakage currents are estimated using a predetermined internal impedance model or table without modifying the electrode-based tool. As an example, the estimated leakage currents may be based on a surface characterization of the internal impedances between each current electrode and the return electrode at all frequencies of operation of an electrode-based tool, and over the temperature range expected downhole. Once an internal impedance model or table is established, an appropriate internal impedance value can be determined based at least in part on the ambient temperature at the time of interest. The internal impedance value obtained using the internal impedance model or table together with measured voltages at the voltage monitoring electrodes closest to the non-active current electrode are then used to estimate currents leaking into or out of non-active current electrodes are then used to estimate currents leaking into or out of non-active current electrodes. In embodiments where the voltages of the current electrodes are not measured by the tool, current electrode voltages are may be estimated, for example, from the measured voltages at the closest voltage monitoring electrodes.

For example, referring to the laterolog tool represented in FIGS. 4-6, model-based leakage currents for non-active electrodes can be approximated as follows:

model-based leakage current equations $$I_{0,f_j} \approx -\frac{V_{M_1,f_j} - 0}{Z_{06,f_j}}, j \neq 0$$

$$I_{1,f_j} \approx -\frac{V_{M_3,f_j} - 0}{Z_{16,f_j}}, j \neq 1$$

$$I_{2,f_j} \approx -\frac{(V_{M_4,f_j} + V_{M_5,f_j})/2 - 0}{Z_{26,f_j}}, j \neq 2$$

$$I_{3,f_j} \approx -\frac{(V_{M_6,f_j} + V_{M_7,f_j})/2 - 0}{Z_{36,f_j}}, j \neq 3$$

$$I_{4,f_j} \approx -\frac{(V_{M_8,f_j} + V_{M_9,f_j})/2 - 0}{Z_{46,f_j}}, j \neq 4$$

$$I_{5,f_j} \approx -\frac{V_{M_{10},f_j} - 0}{Z_{56,f_j}}, j \neq 5$$

From the above model-based leakage currents, various observations can be made including:
  Current is negative if it is leaking into the electrode, according to the adopted sign convention.
  The voltage of the return electrode ($A_6$ in the example of FIGS. 7A and 7B) is approximated as the voltage of the armor (voltage reference).
  The internal impedance varies with frequency, in general, and hence different sets of impedance are used for modes with different frequencies.
  As the internal impedance varies with temperature, different sets of impedance values are needed for different downhole temperatures.

Figure 8:
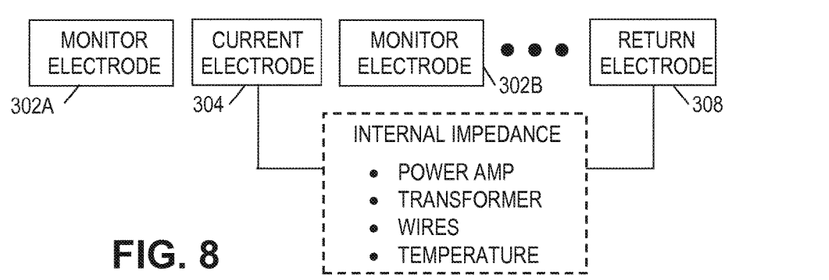
FIG. 8 is a block diagram showing a representation of internal impedance factors related to components of an electrode-based tool.

FIG. 8 is a block diagram showing some components of an electrode-based tool. In FIG. 8, a current electrode 304 (e.g., any of $A_1$-$A_5$ or $A_1'$-$A_5'$) and a return electrode 308 ($A_6$ or $A_6'$) are represented. Further, an internal impedance between the current electrode 304 and return electrode 308 are represented. Further, voltage monitoring electrodes 302A and 302B (e.g., a pair selected from $M_1$-$M_{10}$ or $M_1'$-$M_{10}'$) adjacent to the current electrode 304 are represented. In at least some embodiments, the internal impedance between the represented current electrode 304 and return electrode 308 is a function of power amplifier characteristics, transformer characteristics, wires, and/or an ambient temperature. As an example, the power amplifier, the transformer, and/or other electronics contributing to the internal impedance between the represented current electrode 304 and return electrode 308 may be components mounted to a printed circuit board (PCB). Further, the wires may correspond to insulated wires or traces between the current electrode 304 and the return electrode 308. Such wires or traces may be between the current electrode 304 and a PCB, between components mounted on a PCB, and/or between a PCB and the return electrode 308.

Figure 9:
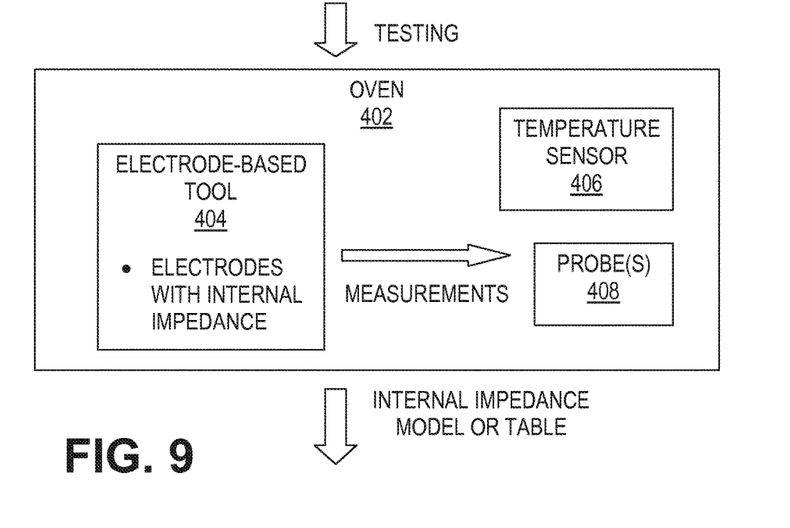
FIG. 9 is a block diagram showing an illustrative testing scenario to derive an internal impedance model or table for an electrode-based tool.

To characterize the internal impedance between current electrodes and return electrode, testing may be performed at earth's surface before deploying an electrode-based tool. As illustrated in FIG. 9, such testing may involve placing an electrode-based tool 404 in an oven 402 and measuring internal impedance values with one or more probes 408. As desired, the probes 408 may be internal or external to the electrode-based tool 404. Further, a temperature sensor 406 may collect temperature measurements during the testing operations. The testing results in an internal impedance values that can be used to generate an internal impedance table such that the internal impedances for current electrodes relative to a return electrode as a function of temperature can be retrieved. Alternatively, the internal impedance values obtained through testing operations may be used to derive an internal impedance curve or model from which internal impedances for current electrodes relative to a return electrode can be derived as a function of temperature.

Figure 10:
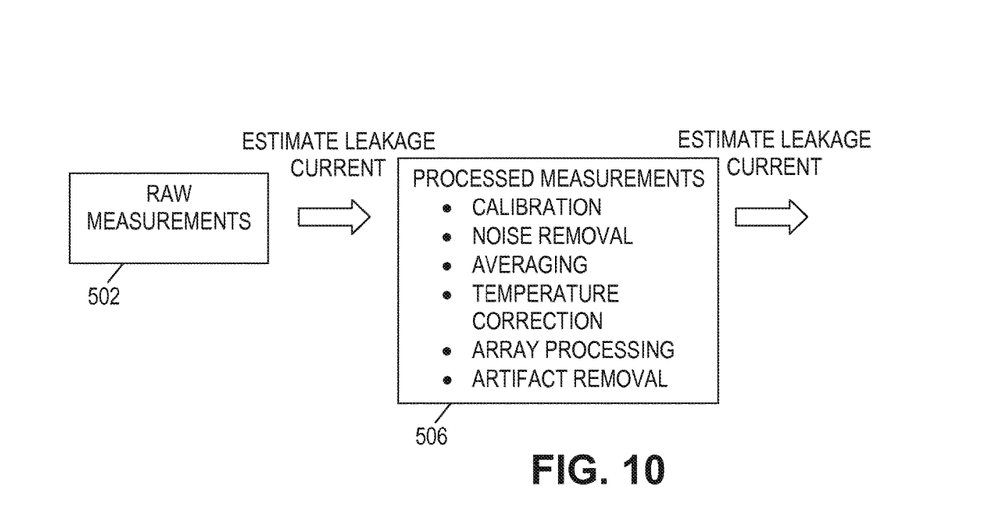
FIG. 10 is a block diagram showing illustrative processing options for measurements collected by an electrode-based tool.

FIG. 10 is a block diagram showing illustrative processing options for measurements collected by an electrode-based tool. In FIG. 10, raw measurements block 502 corresponds to raw measurements collected by an electrode-based tool as described herein. As an example, the raw measurements may correspond to voltage measurements collected by voltage monitoring electrodes as one or more current electrodes inject current into a formation. The processing options block 506 shows various processing options including, but not limited to, calibration operations, noise removal operations, averaging operations, temperature correction operations, array processing operations, and/or artifact removal operations. Some of the operations that can be applied on the acquired raw responses are as follows: filtering to reduce noise; calibration to known calibration experiment; array processing (software focusing) of the data to achieve different depth of detection or vertical/azimuthal resolution. All of these operations above are well-known in the field of EM well logging and their details will not be provided here. The leakage current estimates described herein may be obtained using the raw measurements of block 502 and/or the processed measurements of block 506. To obtain leakage current estimates using an internal impedance model or table as described herein, one or more internal impedance values are selected or calculated as a function of temperature. Once internal impedance values are obtained, at least some raw voltage measurements may be used to estimate leakage current (e.g., I=V/R). Subsequently, the raw measurements and/or the processed measurements are interpreted based at least in part on the estimated leakage currents.

One way to interpret raw measurements and/or processed measurements involves an inversion. Inversion schemes may, for example, convert the raw measurements and/or processed measurements to electromagnetic properties of a formation. A general description of the inversion scheme is as follows. First, a forward model is used to generate the tool response. Then the measured response is compared to signals from the forward model and an iterative numerical optimization problem is solved based on the difference between the two. A numerical model of the formation is constructed for forward modeling. A number of constraints consistent with the a priori knowledge of the formation can be used to single out the correct physical solution. After convergence of the inversion the solution for electromagnetic properties of the formation can be obtained. Example electromagnetic properties include apparent resistivity values and dielectric values. Further, distance to anomalies (e.g., a bed boundary, a nearby casing) can be calculated. By accounting for leakage current, the accuracy of the inversion process is improved. As mentioned herein, modified software focusing equations that are a function of estimated leakage currents may be used.

Figure 11:
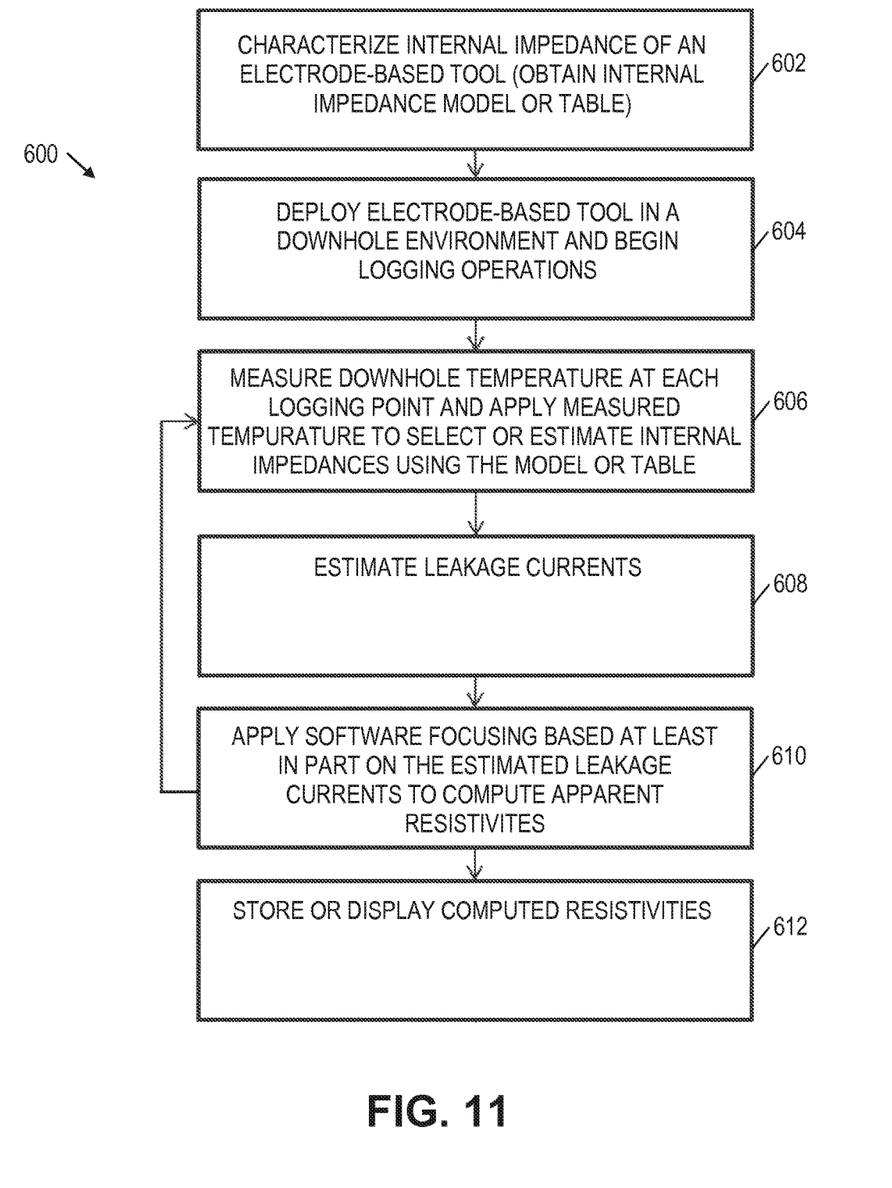
FIG. 11 is a flowchart showing an illustrative resistivity logging method employing an internal impedance model or table.

FIG. 11 is a flowchart showing an illustrative resistivity logging method 600 employing an internal impedance model or table. At block 602, an electrode-based tool is characterized (e.g., at earth's surface) by measuring the internal impedance between each electrode and the return at all frequencies of operation, and over the temperature range expected downhole. The characterization process provides, for example, an internal impedance model or table. In at least some embodiments, the internal impedance between any electrode and the return is mainly the output impedance of the power amplifier used to supply current to that electrode. As an example, power amplifiers impedances can be measured using a low noise, high precision impedance analyzer. In some embodiments, a thermal characterization can be performed by "baking" the amplifier boards in controlled-temperature ovens while making impedance measurements. This thermal characterization can be performed in the factory and does not have to be repeated on-site. As desired, on-site impedance measurements (at one or more temperature points) can be performed to calibrate for any change in amplifier impedance from the previously obtained factory characterization. In an example calibration, the on-site measurement is compared with factory measurements for a given temperature. The comparison results in a scaling factor that can be applied to values in the internal impedance table and/or to values output from an internal impedance model.

After the internal impedance of the electrode-based tool is characterized, the electrode-based tool is deployed in a downhole environment and logging operations begin at block 604 (note: the calibration to scale internal impedances may be performed before or after deployment). At each logging point downhole, temperature is measured and the corresponding set of internal impedances is calculated at block 606. For example, in at least some embodiments, internal impedances are calculated by looking up values in an internal impedance table or by applying the measured temperature to an internal impedance model. At block 608, the leakage currents from non-active electrodes are estimated (e.g., using the model-based leakage current equations). In at least some embodiments, voltage measurements as well as internal impedances obtained using an internal impedance model or table are used to estimate leakage currents. At block 610, software focusing is applied, based at least in part on the estimated leakage currents, to compute apparent resistivities (e.g., see the equations for Modified Focused Modes 1-5). At block 612, the computed resistivities are stored or displayed (e.g., in the form of a log).

Figure 12:
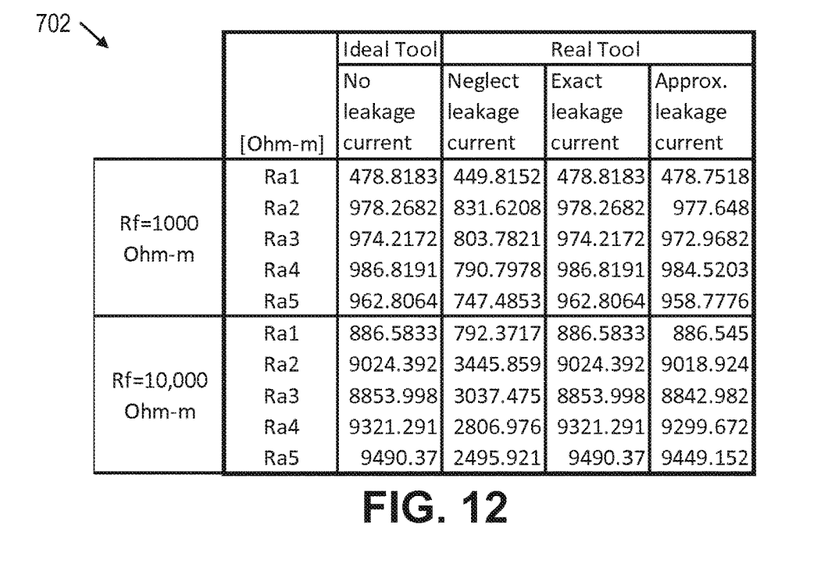
FIGS. 12 and 13 are tables showing a comparison of illustrative numerical results of a real electrode-based tool with numerical results of an ideal electrode-based tool.
Figure 13:
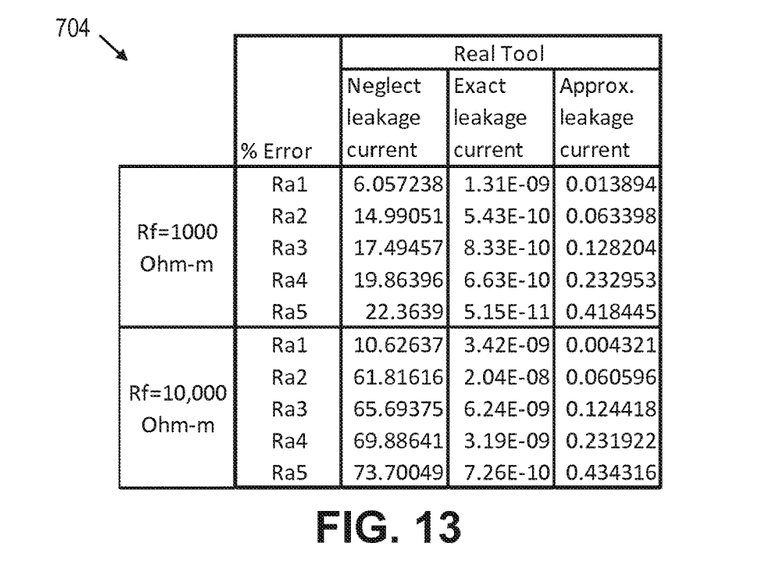

To demonstrate the accuracy of the proposed model-based or table-based leakage currents, consider an array laterolog tool, such as the one represented in FIGS. 4-6, operating in 8" diameter borehole filled with mud with resistivity $R_m$=0.1 $\Omega \cdot m$. FIG. 12 shows a table comparing the apparent resistivities of an ideal tool with infinite input impedances with the apparent resistivities of a real tool with input impedances of 10,000$\Omega$. Meanwhile, FIG. 13 shows a table comparing the percentage error in apparent resistivities of a real tool relative to an ideal tool. For the example results given in the tables of FIGS. 12 and 13, the input impedance is assumed to constant for all electrodes and over all frequencies of operation for simplicity. Two formation resistivities of 1000 $\Omega \cdot m$ and 10,000 $\Omega \cdot m$ are considered.

For the sake of comparison, real tool results are obtained using three different methods:
1) Measuring only injected currents from active electrodes and neglecting (setting to zero) leakage currents at non-active electrodes. This is equivalent to treating the real tool as if it were ideal.

2) Measuring all currents at active and non-active electrodes and processing them according to the Modified Focused Modes 1-5 described herein.
3) Measuring injected currents from active electrodes and internal impedances and estimating leakage currents according to the model-based leakage current equations described herein.

Results show the following:

Neglecting leakage current in real tools results in significant errors in apparent resistivity that increase with increasing the ratio between formation (and mud) resistivity and the tool internal impedance.

Measuring all currents in active and non-active electrodes completely resolves the impedance issue, as expected.

The proposed method for estimating leakage currents from internal impedance characterization produces results that are very close to the ideal tool results (error below 0.5%) even with high formation resistivity.

At least some of the disclosed methods and systems related to processing electrode-based tool measurements and accounting for leakage current using a predetermined internal impedance model or table involve digital electronic circuitry, or computer software, firmware, or hardware, including the structures disclosed in this specification and their structural equivalents, or in combinations of one or more of them. For example, some of the calculations described herein can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described herein can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit). As used herein, the term "configured to" as applied to processors (or other programmable components) refers to availability of executable software instructions, to firmware included with the processor, and/or to hardware or circuitry included with the processor to perform one or more operations or calculations (e.g., estimating leakage currents, applying the estimated leakage currents, storing results, displaying results or related information/images).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 14:
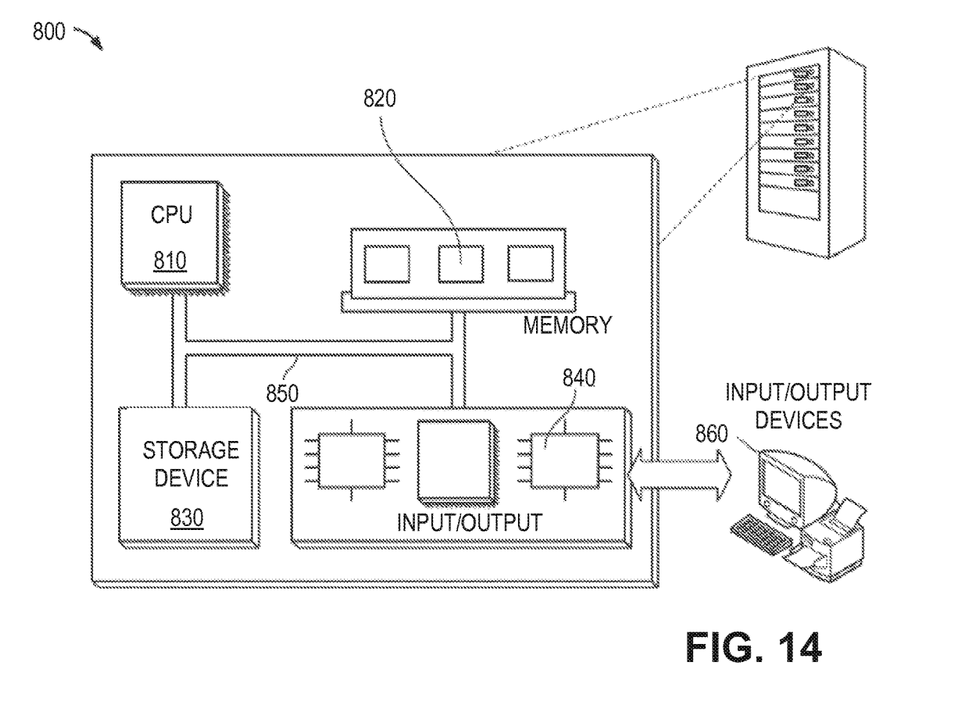
FIG. 14 is a diagram of an illustrative computer system.

FIG. 14 shows an example computer system 800 that may be used to process measurements from electrode-based tools and account for leakage current based at least in part on an internal impedance model or table. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the system 800.

The input/output device 840 provides input/output operations for the system 800. In some implementations, the input/output device 840 can include one or more network interface devices, e.g., an Ethernet card; a serial communication device, e.g., an RS-232 port; and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 860. In some implementations, mobile computing devices, mobile communication devices, and other devices can be used.

The computer system 800 may, for example, receive voltage measurements, temperature measurements, and current measurements collected by an electrode-based tool. The temperature measurements are applied to obtain internal impedance values using a predetermined internal impedance model or table. The internal impedance values and the voltage measurements can then be used to estimate leakage currents between electrodes of interest. Further, the estimated leakage current can be applied to correct electrode-based tool measurements (e.g., a measured return current) or derived values such as apparent resistivities, dielectric properties, and/or distance to anomaly values. As an example, the computer system 800 may apply the estimated leakage currents to modified focusing mode equations to estimate apparent resistivity at one or more depths of investigation. Accounting for leakage currents as described herein improves the accuracy of derived electromagnetic properties compared to ignoring leakage currents or otherwise assuming such leakage currents are negligible.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

Embodiments disclosed herein include:

A: A system that comprises an electrode-based tool for deployment in a downhole environment, the electrode-based tool having a plurality of current electrodes, at least one voltage monitoring electrode, and at least one return electrode. The electrode-based tool further comprises electronics to collect one or more voltage measurements from the at least one voltage monitoring electrode as current from at least one of the plurality of current electrodes is injected into the downhole environment and flows to the at least one return electrode. The system further comprises at least one processor to estimate leakage current between at least one of the plurality of current electrodes and the at least one return electrode based on the collected one or more voltage measurements and a predetermined internal impedance model or table, wherein the at least one processor is configured to derive a corrected downhole environment parameter based at least in part on the estimated leakage current.

B: A method that comprises obtaining an internal impedance model or table for electrodes of an electrode-based tool. The method further comprises deploying the electrode-based tool in a downhole environment, the electrode-based tool having a plurality of current electrodes, at least one voltage monitoring electrode, and at least one return electrode. The method further comprise collecting one or more voltage measurements using the at least one voltage monitoring electrode as a current from at least one of the plurality of current electrodes is injected into the downhole environment and flows to the at least one return electrode. The method further comprises estimating leakage current between at least one of the plurality of current electrodes and the at least one return electrode based on the collected one or more voltage measurements and the internal impedance model or table. The method further comprises deriving a correction for a downhole environment parameter based at least in part on the estimated leakage current. The method further comprises storing or displaying the corrected downhole environment parameter.

Each of the embodiments, A and B, may have one or more of the following additional elements in any combination. Element 1: wherein the electrode-based tool includes at least one temperature sensor, and wherein the processor is configured to estimate the leakage current based in part on at least one downhole temperature value obtained using the at least one temperature sensor. Element 2: wherein at least some of the plurality of current electrodes are axially-spaced along a tool body of the electrode-based tool. Element 3: wherein at least some of the plurality of current electrodes have a concentric arrangement relative to each other or relative to the at least one return electrode. Element 4: wherein the predetermined internal impedance model or table is obtained from leakage current tests applied to the electrode-based tool prior to its deployment in the downhole environment. Element 5: wherein the processor is configured to apply the estimated leakage current to at least one focused mode calculation to calculate apparent resistivity of the downhole environment at one or more depths of investigation. Element 6: wherein the processor is configured to estimate the leakage current based at least in part on a ratio of a weighted combination of voltage measurements to a weighted combination of values from the internal impedance model or table. Element 7: wherein the corrected downhole environment parameter comprises a distance between the electrode-based tool and a subsurface anomaly. Element 8: wherein the corrected downhole environment parameter comprises an electromagnetic property of the downhole environment. Element 9: wherein the processor is configured to calculate a quality factor for the downhole environment parameter based at least in part on the estimated leakage current. Element 10: wherein the processor is configured to raise an alert if the estimated leakage current is greater than a threshold value.

Element 11: further comprising measuring a downhole temperature and estimating the leakage current based at least in part on the measured downhole temperature. Element 12: further comprising applying the estimated leakage current to at least one focused mode calculation to calculate apparent resistivity of the downhole environment at one or more depths of investigation. Element 13: wherein obtaining the internal impedance model or table comprises performing leakage current tests on the electrode-based tool prior to its deployment in the downhole environment. Element 14: wherein estimating the leakage current comprises determining a ratio of a weighted combination of voltage measurements to a weighted combination of values from the internal impedance model or table. Element 15: wherein said deploying involves lowering the electrode-based tool using wireline, slickline, or coiled tubing. Element 16: wherein said deploying involves a lowering the electrode-based tool as part of a LWD assembly. Element 17: further comprising calculating a quality factor for the downhole environment parameter based at least in part on the estimated leakage current. Element 18: further comprising raising an alert if the estimated leakage current is greater than a threshold value.

Numerous other modifications, equivalents, and alternatives, will become apparent to those skilled in the art once the above disclosure is fully appreciated. For example, the techniques described herein are valid for any impedance network that may be present in between electrodes of an electrode-based tool. Besides the array laterolog tool described herein, other tools that could benefit from internal impedance characterization and model-based leakage currents include, for example, dual laterolog tools, micro-resistivity logging tools, spherically focused logging tools, micro-spherically focused logging tools. Further, internal impedance characterization and model-based leakage currents may be applied to surface prospecting arrangements that employ electrodes to analyze surface-to-surface responses, surface-to-borehole responses, or borehole-to-borehole responses (e.g., cross-well properties). It is intended that the following claims be interpreted to embrace all such modifications, equivalents, and alternatives where applicable.

What is claimed is:

1. A system that comprises:
   an electrode-based tool for deployment in a downhole environment, the electrode-based tool having:
   a plurality of current electrodes;
   at least one voltage monitoring electrode;
   at least one return electrode; a temperature sensor; and
   electronics to collect one or more voltage measurements from the at least one voltage monitoring electrode as current from at least one of the plurality of current electrodes is injected into the downhole environment and flows to the at least one return electrode; and
   at least one processor to estimate leakage current between at least one of the plurality of current electrodes and the at least one return electrode based on the collected one or more voltage measurements and a predetermined internal impedance model or table, wherein the at least one processor is configured to derive a corrected downhole environment parameter based at least in part on the estimated leakage current, wherein the processor is configured to estimate the leakage current based in part on at least one downhole temperature value obtained using the at least one temperature sensor.

2. The system of claim 1, wherein the leakage current estimated by the processor is within the tool between the at least one of the plurality of current electrodes and the at least one return electrode.

3. The system of claim 1, wherein at least some of the plurality of current electrodes are axially-spaced along a tool body of the electrode-based tool.

4. The system of claim 1, wherein at least some of the plurality of current electrodes have a concentric arrangement relative to each other or relative to the at least one return electrode.

5. The system of claim 1, wherein the predetermined internal impedance model or table is obtained from leakage current tests applied to the electrode-based tool prior to its deployment in the downhole environment.

6. The system of claim 1, wherein the processor is configured to apply the estimated leakage current to at least one modified software focusing equation to calculate apparent resistivity of the downhole environment at one or more depths of investigation.

7. The system of claim 1, wherein the processor is configured to estimate the leakage current based at least in part on a ratio of a weighted combination of voltage measurements to a weighted combination of values from the internal impedance model or table.

8. The system of claim 1, wherein the corrected downhole environment parameter comprises a distance between the electrode-based tool and a subsurface anomaly.

9. The system of claim 1, wherein the corrected downhole environment parameter comprises an electromagnetic property of the downhole environment.

10. The system of claim 1, wherein the processor is configured to calculate a quality factor for the downhole environment parameter based at least in part on the estimated leakage current.

11. The system of claim 1, wherein the processor is configured to raise an alert if the estimated leakage current is greater than a threshold value.

12. A method that comprises:
   obtaining an internal impedance model or table for electrodes of an electrode-based tool, wherein the internal impedance model or table is based at least in part as a function of temperature;
   deploying the electrode-based tool in a downhole environment, the electrode-based tool having a plurality of current electrodes, at least one voltage monitoring electrode, and at least one return electrode; and
   collecting one or more voltage measurements using the at least one voltage monitoring electrode as a current from at least one of the plurality of current electrodes is injected into the downhole environment and flows to the at least one return electrode;
   measuring a downhole temperature, wherein leakage current is estimated based at least in part on the measured downhole temperature;
   estimating leakage current between at least one of the plurality of current electrodes and the at least one return electrode based on the collected one or more voltage measurements and the internal impedance model or table;
   deriving a correction for a downhole environment parameter based at least in part on the estimated leakage current; and
   storing or displaying the corrected downhole environment parameter.

13. The method of claim 12, further comprising applying the estimated leakage current to at least one modified software focusing equation to calculate apparent resistivity of the downhole environment at one or more depths of investigation.

14. The method of claim 12, wherein obtaining the internal impedance model or table comprises performing leakage current tests on the electrode-based tool prior to its deployment in the downhole environment.

15. The method of claim 12, wherein estimating the leakage current comprises determining a ratio of a weighted combination of voltage measurements to a weighted combination of values from the internal impedance model or table.

16. The method of claim 12, wherein said deploying involves lowering the electrode-based tool using wireline, slickline, or coiled tubing.

17. The method of claim 12, wherein said deploying involves a lowering the electrode-based tool as part of a logging-while-drilling (LWD) assembly.

18. The method of claim 12, further comprising calculating a quality factor for the downhole environment parameter based at least in part on the estimated leakage current.

19. The method of claim 12, further comprising raising an alert if the estimated leakage current is greater than a threshold value.

* * * * *